(12) United States Patent
Hupfield et al.

(10) Patent No.: US 6,284,859 B1
(45) Date of Patent: *Sep. 4, 2001

(54) POLYMERIZATION OF SILOXANES

(75) Inventors: Peter Hupfield, Carmarthen; Avril Surgenor, Cardiff; Richard Taylor, Barry, all of (GB)

(73) Assignee: Dow Corning Limited, Barry (GB)

(*) Notice: Subject to any disclaimer, the term of this patent is extended or adjusted under 35 U.S.C. 154(b) by 0 days.

This patent is subject to a terminal disclaimer.

(21) Appl. No.: 09/458,251

(22) Filed: Dec. 9, 1999

(30) Foreign Application Priority Data

Dec. 9, 1998 (GB) ................................................ 9827036

(51) Int. Cl.$^7$ .................................................... C08G 77/08
(52) U.S. Cl. .............................. 528/23; 528/21; 528/37; 528/12; 556/459; 556/460
(58) Field of Search ............................... 528/21, 23, 37, 528/12; 556/459, 460

(56) References Cited

U.S. PATENT DOCUMENTS

| | | | |
|---|---|---|---|
| 5,688,888 | 11/1997 | Burkus et al. | 528/22 |
| 6,054,548 | * 4/2000 | Currie et al. | |

FOREIGN PATENT DOCUMENTS

| | | |
|---|---|---|
| 860461 A2 | 8/1998 | (EP) . |
| 879838 A2 | 11/1998 | (EP) . |

OTHER PUBLICATIONS

Reinhard Schwesinger, et al., "Extremely Strong, Uncharged Auxiliary Bases; Monomeric and Polymer–Supported Polyaminophosphazenes (P2–P5)", Liebigs Ann. 1996, pp. 1055–1081.

* cited by examiner

*Primary Examiner*—Robert Dawson
*Assistant Examiner*—Kuo-Liang Peng
(74) *Attorney, Agent, or Firm*—Jennifer S. Warren

(57) ABSTRACT

A polymerization process comprising mixing siloxanes having silicon-bonded groups R' with ionic phosphazene base catalysts and allowing condensation via reaction of Si—R' groups with the formation of a Si—O—Si linkage, R' denoting a hydroxyl group or a hydrocarbonoxy group having up to 8 carbon atoms is claimed. The catalysts may be of the general formulae:

$$\{((R^1{}_2N)_3P{=}N{-})_x(R^1{}_2N)_{3-x}P{-}N(H)R^2\}^+\{A^-\} \text{ or}$$

$$\{((R^1{}_2N)_3P{=}N{-})_y(R^1{}_2N)_{4-y}P\}^+\{A\}^-$$

in which $R^1$ is hydrogen or an optionally substituted hydrocarbon group or in which two $R^1$ groups bonded to the same N atom may be linked to complete a heterocyclic ring, $R^2$ is hydrogen or an optionally substituted hydrocarbon group, x is 1, 2 or 3, y is 1, 2, 3 or 4 and A is an anion. Also claimed is a process which comprises mixing siloxanes having silicon-bonded groups R' and cyclic or linear siloxanes having no silicon-bonded groups R' with ionic phosphazene base catalysts and allowing the siloxane having silicon-bonded groups R' to condense and the cyclic and linear siloxanes having no silicon-bonded R' groups to polymerize by equilibration.

9 Claims, No Drawings

POLYMERIZATION OF SILOXANES

FIELD OF THE INVENTION

This invention relates to the condensation polymerization of siloxanes catalyzed by certain phosphazene bases.

BACKGROUND OF THE INVENTION

In EP0860461-A, there is described a process for the ring-opening polymerization of cyclosiloxanes, which comprises contacting a cyclosiloxane with 1 to 500 ppm of a phosphazene base, by weight of cyclosiloxane, in the presence of water. In GB 2311994, there is described a method of effecting polycondensing which comprises contacting at a temperature of from 0 to 200° C. and a pressure up to 350 torr, a silanol-containing organosiloxane with an amount of a peralkylated phosphazene base which is effective for polycondensation of said organosiloxane. The preferred peralkylated phosphazene base has the formula

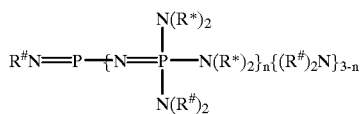

wherein R# is a $C_{1-4}$ alkyl radical, R* is a $C_{1-10}$ alkyl radical and n is 2 or 3. EP0879838-A describes a process of preparing a polymer which comprises conducting ring-opening polymerization of a 4- to 10-membered cyclic monomer in the presence of a phosphazenium salt catalyst of an active hydrogen compound represented by the formula

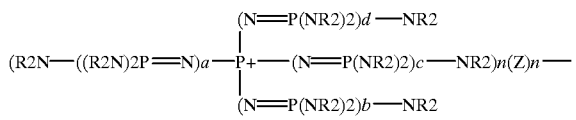

SUMMARY OF THE INVENTION

This invention is a process for polymerizing a siloxane having silicon-bonded groups R', wherein R' denotes a hydroxyl group or a hydrocarbonoxy group having up to 8 carbon atoms, comprising mixing the siloxane with an ionic phosphazene base catalyst and allowing the siloxane to polymerize by condensation via reaction of Si—R' groups with the formation of a Si—O—Si linkage. We have surprisingly found that ionic phosphazene base materials are at least as effective as catalysts for polymerization of siloxanes which comprises the condensation of silanol groups. We have furthermore found that these ionic phosphazene base materials are useful in the combined polymerization via condensation and polymerization by equilibration, when carried out simultaneously. This is unexpected as there is usually a substantial difference in catalytic rate between both reactions.

DETAILED DESCRIPTION OF THE INVENTION

A polymerization process according to the invention comprises mixing siloxanes having silicon-bonded groups R' with ionic phosphazene base catalysts and allowing condensation via reaction of Si—R' groups with the formation of a Si—O—Si linkage, R' denoting a hydroxyl group or a hydrocarbonoxy group having up to 8 carbon atoms.

Numerous phosphazene bases, some ionic phosphazene bases and routes for their synthesis have been described by Schwesinger et al., Liebigs Ann. 1996, 1055–1081. Ionic phosphazene base materials have the formula $A^+B^-$, wherein $A^+$ is the phosphazene base cation, and $B^-$ is an anion, which is preferably a strong anion such as fluoride or hydroxide, which is active in initiating polymerization.

The ionic phosphazene base is found to be a very powerful catalyst for the polymerization, and can therefore be present in a relatively low proportion, for example from 2 to 1000 ppm by weight, preferably 10 to 500 ppm, based on the weight of siloxanes having Si—R' groups. The proportion of catalyst actually used will be selected depending on the speed of polymerization that is sought.

A proportion of water may be present in the reaction. Where this is the case, it is preferably at least 0.5, more preferably from 0.5–10 mols per mol of the ionic phosphazene base, most preferably from 1 to 10 mols per mol of ionic phosphazene base. It is possible to allow higher proportions of water, and this can have the benefit of enabling greater control over the polymerization reaction, as described in more detail below.

In principle, any ionic phosphazene base is suitable for use in the present invention. Phosphazene bases generally include the following core structure P=N—P=N, in which free N valencies are linked to hydrogen, hydrocarbon, —P=N or =P—N, and free P valencies are linked to —N or =N. Some ionic phosphazene bases are commercially available e.g. from Fluka Chemie AG, Switzerland. The ionic phosphazene bases preferably have at least 3 P-atoms. Some preferred phosphazene bases are of the following general formulae:

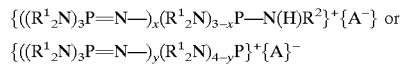

in which $R^1$, which may be the same or different in each position, is hydrogen or an optionally substituted hydrocarbon group, preferably a $C_1$–$C_4$ alkyl group, or in which two $R^1$ groups bonded to the same N atom may be linked to complete a heterocyclic ring, preferably a 5- or 6-membered ring; $R^2$ is hydrogen or an optionally substituted hydrocarbon group, preferably a $C_1$–$C_{20}$ alkyl group, more preferably a $C_1$–$C_{10}$ alkyl group; x is 1, 2 or 3, preferably 2 or 3; y is 1, 2, 3 or 4, preferably 2, 3 or 4; and A is an anion, preferably fluoride, hydroxide, silanolate, alkoxide, or bicarbonate.

Particularly suitable compounds are those where $R^1$ is methyl, $R^2$ is tertiary butyl or tertiary octyl, x is 3, y is 4 and A is fluoride or hydroxide.

Alternative phosphazene base catalysts have the general formula (1)

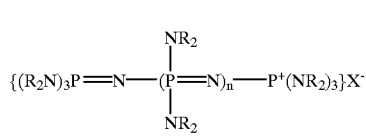

wherein R denotes a hydrocarbon having 1 to 10 carbon atoms, e.g. methyl, or wherein the two R groups on one N atom form with the N atom a heterocyclic group, e.g. pyrrolidine, X denotes an anion and n is from 1 to 10. These can be prepared by reacting a linear phosphonitrile halide compound with a secondary amine or a salt of a secondary amine or a metal amide thereof to form an aminated phosphazene material, followed by an ion exchange reaction replacing the anion with a nucleophilic anion A—.

The polymerization can be carried out in bulk or in the presence of a solvent. Suitable solvents are liquid hydrocarbons or silicone fluids. The ionic phosphazene base catalyst can be diluted in a polar solvent, for example dichloromethane or an alcohol, or dispersed in a silicone fluid such as polydiorganosiloxanes. Where the ionic phosphazene base catalyst is initially in a solvent, the solvent can be removed by evaporation under vacuum, and the catalyst dispersed in a silicone fluid to give a stable clear solution. When this silicone dissolved catalyst is used for polymerization reactions, the catalyst disperses evenly and gives reproducible results. The catalyst can in some cases be dissolved in water, and this has the advantage of moderating and enabling greater control over the polymerization reaction, as described below.

The polymerization reaction can be carried out at ambient temperature or under heating at a temperature as high as 250° C. or 300° C. or even higher. Heating, for example to 100° C. or higher, is appropriate when the catalyst activity has been moderated as described below. The preferred temperature range may be from 50 to 170° C. The time taken for polymerization will depend on the activity of the catalyst in the chosen system, and on the desired polymer product. In the absence of moderation, the ionic phosphazene base catalysts are sufficiently active to convert siloxanes to high molecular weight polysiloxane gums within a short time frame.

Starting materials for the condensation reaction of silanol containing siloxanes are organosiloxanes having silicon-bonded hydroxyl groups or hydrolyzable groups such as alkoxy or aryloxy groups, which may form silanol groups in situ. These include, for example, organosiloxanes having the general formula (3):

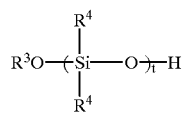

(3)

In formula (3), $R^3$ is a hydrogen or an alkyl or aryl group having up to 8 carbon atoms, each $R^4$ is the same or different and denotes a monovalent hydrocarbon group preferably having 1 to 18 carbon atoms or halogenated hydrocarbon group preferably having 1 to 18 carbon atoms and t is an integer having a value of from at least 2. Preferably $R^4$ denotes an alkyl group having from 1 to 6 carbon atoms and more preferably a methyl group. The value of t is preferably such that the average viscosity of the polyorganosiloxanes does not exceed 200 mm$^2$/s at 25° C.

Suitable organosiloxanes may have silicon-bonded R' groups which are in the polymer chain, but preferably these are present in end-groups. organosiloxanes having terminal silicon-bonded hydroxyl groups are well known in the art and are commercially available. They can be made by techniques known in the art, for example, by hydrolysis of a chlorosilane, separation of the linear and cyclic material produced by the hydrolysis, and subsequently polymerizing the linear material. Preferably suitable organosiloxanes have one silicon-bonded hydroxyl group in each terminal group and have at least 80% of the $R^4$ groups denote a methyl group. Suitable organosiloxanes for use as reagents in a polymerization process in which the ionic phosphazene catalysts are used include organosiloxanes having terminal hydroxydiorganosiloxane units, e.g. hydroxyldimethyl siloxane end-blocked polydimethylsiloxanes, hydroxyldimethyl siloxane end-blocked polydimethyl polymethylphenyl siloxane copolymers.

Thus the process according to the invention will be useful for making polyorganosiloxanes having units of the general formula $R''_a SiO_{4-a/2}$ (2) wherein R" is hydroxyl or a hydrocarbon and a has a value of from 0 to 3. Preferably at least 80%. of all R" groups are alkyl or aryl groups, more preferably methyl groups. Most preferably substantially all R" groups are alkyl or aryl groups, especially methyl groups. The polyorganosiloxanes are preferably those in which the value of a is 2 for practically all units, except for the end-blocking units, and the siloxanes are substantially linear polymers of the general formula $R''(R''_2SiO)_p SiR''_3$, (3) wherein R" is as defined above and p is an integer. It is, however, also possible that small amounts of units wherein the value of a denotes 0 or 1 are present. Polymers with such units in the chain would have a small amount of branching present. Preferably R" denotes a hydroxyl group or an alkyl or aryl group, e.g. methyl or phenyl. The viscosity of the polyorganosiloxanes which may be produced by the process using a catalyst according to the present invention may be in the range of from 1000 to many millions mm$^2$/s at 25° C., depending on the reaction conditions and raw materials used in the method of the invention.

The process according to the invention can be used to make a whole range of polyorganosiloxanes, including liquid polymers and gums of high molecular weight, for example from $1 \times 10^6$ to $100 \times 10^6$. The molecular weight of polyorganosiloxanes is effected by the concentration of materials used in the reaction, which will provide end groups used in the process according to the invention, the molecular weight is determined by the catalyst concentration. An ingredient providing end-blocker groups may be added in a proportion calculated to produce a desired molecular weight of polymer. Water also acts as a end-blocker, with the introduction of hydroxyl functional groups. The catalyst used in the present invention has sufficient activity to enable the formation of polymers in a reasonable time at a low catalyst concentration.

The process of the invention includes a process which comprises mixing siloxanes having silicon-bonded groups R' and cyclic or linear siloxanes having no silicon-bonded groups R' with ionic phosphazene base catalysts and allowing the siloxane having silicon-bonded groups R' to condense and the cyclic and linear siloxanes having no silicon-bonded R' groups to polymerize by equilibration.

The ionic phophazene base catalysts are known to be very effective polymerization catalysts to make polyorganosiloxane materials from cyclic siloxanes via equilibration, as disclosed in EP0860461 indicated above. The speed of polymerization via equilibration seems to be substantially faster than for the condensation reaction described in this application. It was therefore surprising to find that the same catalyst can be used for combined polymerization via condensation and equilibration by mere mixture of the siloxane materials used for condensation polymerization, as described above with cyclic siloxanes or certain linear siloxanes as described below, which are suitable for polymerization by equilibration. The combined reaction did not seem to favor one polymerization reaction to the detriment of the other.

Suitable cyclosiloxanes, also known as a cyclic siloxanes, are well known and commercially available materials. They have the general formula $(R'_2 SiO)n$ wherein R' is as defined above, and preferably denotes hydrogen or an optionally substituted alkyl, alkenyl, aryl, alkaryl or aralkyl group having up to 8 carbon atoms, n denotes an integer with a value of from 3 to 12. $R^2$ can be substituted, e.g. by halogen such as fluorine or chlorine. The alkyl group can be, for example, methyl, ethyl, n-propyl, trifluoropropyl, n-butyl, sec-butyl, and tertiary-butyl. The alkenyl group can be, for example, vinyl, allyl, propenyl, and butenyl. The aryl and aralkyl groups can be, for example, phenyl, tolyl, and benzoyl. The preferred groups are methyl, ethyl, phenyl, vinyl, and trifluoropropyl. Preferably at least 80% of all $R^2$ groups are methyl or phenyl groups, most preferably methyl. It is most preferred that substantially all $R^2$ groups are methyl groups. Preferably the value of n is from 3 to 6, most preferably 4 or 5. Examples of suitable cyclic siloxanes are octamethyl cyclotetrasiloxane, decamethyl pentacyclosiloxane, cyclopenta (methylvinyl) siloxane, cyclotetra (phenylmethyl) siloxane and cyclopenta methylhydrosiloxane. One particularly suitable commercially available material is a mixture of octamethylcyclotetrasiloxane and decamethylcyclopentasiloxane.

The starting material for equilibration polymerization can be instead of or in addition to cyclic siloxanes as described above, any organosiloxane material having units of the general formula $R^5_a SiO_{4-a/2}$ wherein R' denotes a hydrogen atom, a hydrocarbon group having from 1 to 18 carbon atoms, a substituted hydrocarbon group having from 1 to 18 carbon atoms or a hydrocarbonoxy group having up to 18 carbon atoms and a is as above defined but preferably has on average a value of from 1 to 3, preferably 1.8 to 2.2. Preferably the organosiloxanes are dialkylsiloxanes, and most preferably dimethylsiloxanes. They are preferably substantially linear materials, which are end-blocked with a siloxane group of the formula $R^5_3 SiO_{1/2}$, wherein $R^5$ is R'.

Suitable end-blockers for the equilibration polymers to be formed, include polysiloxanes in the molecular weight range from 160 upwards, in particular organosiloxanes of the general formula $MD_xM$ where M is $(CH_3)_3SiO_{1/2}$, D is $(CH_3)_2SiO_{2/2}$ and x has a value of from 0 to 20. The end-blocker may have one or more functional groups such as hydroxyl, vinyl or hydrogen.

By using a combination of condensation and equilibration reactions, it is possible to arrange the reagent mixture in a way to control the end-product, for example by controlling the amount and type of ingredients which are used to cause end-blocking, by varying the ratio of siloxanes which polymerize via condensation to siloxanes which polymerize via equilibration.

When the desired polymer has been formed, it is usually desirable to neutralize the catalyst to stabilize the product and prevent any further reaction. Suitable neutralizing agents are acids such as acetic acid, silyl phosphate, polyacrylic acid chlorine substituted silanes, silyl phosphonate or carbon dioxide.

We have found that air reacts very rapidly with the catalyst solutions giving a hazy material which eventually leads to an insoluble liquid phase. This is believed to be due to the reaction of the catalyst with $CO_2$ to form a carbonate salt. We have also found that this deactivation of the catalyst can be reversed e.g. by heating, purging with inert gas or subjecting the mixture to reduced pressure. This makes it possible to moderate or control the polymerization reaction. This is particularly advantageous in view of the very rapid reaction which occurs when the catalyst is not moderated. Because of the very low levels of catalyst employed in these reactions (which can be as low as 1 to 10 ppm), the reaction with water and $CO_2$ needs to be taken into account to control the reaction and obtain reproducible results. By dissolving the phosphazene base in water, the catalyst activity becomes much more controllable and the polymers produced are of lower molecular weight. This is caused by the water acting as a catalyst inhibitor and also as an end-blocker. The inhibiting effect of the water can be reduced by reducing the amount of water present e.g. by heating. At temperatures below 100° C. the rate of polymerization is relatively slow in the presence of water and/or $CO_2$, for example taking up to more than 24 hours to reach gum viscosity. At temperatures above about 100° C. (e.g. 100 to about 150° C.), polymerization becomes much faster, for example taking up to 5 to about 60 minutes to reach gum viscosity. Such control of the reaction can also be achieved if the water is mixed with or replaced by alcohol (e.g. $C_1$–$C_6$ alcohols such as methanol or ethanol).

We have also found that polymerization can be prevented by exposing a mixture of cyclosiloxane and phosphazene base catalyst to air and/or $CO_2$ or to a larger amount of water. The polymerization can then be initiated ("command polymerization") simply by removing the air and/or $CO_2$ or the water e.g. by heating the mixture (e.g. to 100° C. to 170° C. for a few minutes). A mixture of octamethylcyclotetrasiloxane and 2 to 50 ppm catalyst is stable in air at 20° C. for extended periods (up to about 7 days).

Thermogravimetric analysis of the polymers produced according to the invention shows that they have enhanced thermal stability. High molecular weight gums have been produced with decomposition onset temperatures of more than about 450° C., and silicone fluids have been produced with decomposition onset temperatures of more than about 500° C. The enhanced thermal stability is attributed to the very low levels of catalyst residues remaining in the product. The low catalyst residues also mean that a filtration step is usually not necessary, which is a very significant process advantage.

EXAMPLES

The following Examples illustrate the invention. Unless stated otherwise, all parts and percentages are by weight and all viscosities are at 25° C.

Synthesis of tetrakis(tris(dimethylamino) phosphoranilideneamino)phosphonium hydroxide Tetrakis(tris(dimethylamino)phosphoranilideneamino) phosphonium chloride (5 mmol) was dissolved in a mixed solvent of 50% methanol-water, to yield a 0.2M solution. The solution was then passed through a basic ($OH^-$) anion exchange resin, which after removal of the water and solvent under reduced pressure yielded the desired basic crystalline solid in approximately 95% yield.

Example 1

A α,ω-silanol terminated polydimethylsiloxane with a viscosity of 75.8 $mm^2/s$ was charged to a reaction vessel. This was heated to 130° C. under reduced pressure (10 mbar) in the presence of 100 ppm of tetrakis (tris (dimethylamino) phosphoranilideneamino) phosphonium hydroxide catalyst. After approximately twenty minutes the reaction was neutralized yielding a polymer with a viscosity of approximately 940,00 $mm^2/s$ and a non volatile content of 89%. Residual silanol was determined to be approximately 73 ppm.

Example 2

A 50/50 mixture of silanol end-blocked polydimethylsiloxane, having a viscosity of 60 $mm^2/s$ and cyclic siloxanes was charged to a reaction vessel. This was heated to 130° C. under reduced pressure (400 mbar) in the presence of 100 ppm of catalyst used in Polymerization Example 1. After approximately twenty minutes the reaction was neutralized yielding a polymer with a viscosity of approximately 500,000 mm²/s and a non volatile content of 88%. Residual silanol was determined to be approximately 190 ppm.

I. Synthesis of Linear Phosphonitrilic Chlorides

Phosphorous pentachloride (0.237 moles) was charged to a three necked flask fitted with dropping funnel, thermometer and condenser. To this was added anhydrous toluene and the flask contents cooled to −5° C. Hexamethyldisilazane (HMDZ) (0.191 moles) was added dropwise and upon addition the flask contents were allowed to warm to room temperature, upon which they were refluxed at a reaction temperature of 120° C. for two hours. The solvent was then removed under reduced pressure and the solid residue stored under nitrogen. NMR analysis showed the material to have the following structure

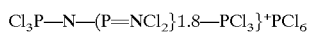

II. Synthesis of Polyaminophosphazenium Hydroxide

Toluene and the linear phosphonitrilic chloride (0.023 moles) were charged to a three necked flask fitted with a thermometer, condenser and dropping funnel. The reaction mixture was allowed to cool to −50° C. and a mixture of triethylamine and pyrollidine (0.28 moles each) was added dropwise. The reaction mixture was then allowed to warm to room temperature upon which it was heated to approximately 60° C. for up to 40 hours. The orange solution was filtered to remove triethylammonium chloride and then washed with toluene. The toluene was then removed under reduced pressure to yield an orange oil. The oil was then dispersed in distilled water and methanol (1:1) and passed through a basic (OH⁻) anion exchange resin. The water and methanol were then removed under reduced pressure to yield a basic oil in approximately 90% yield. This comprised a polyaminophosphazenium hydroxide.

Example 3

A α,ω-silanol terminated polydimethylsiloxane (11,046 ppm OH; 75.8 mm²/s) was charged to a reaction vessel. This was heated to 100° C. under reduced pressure (40 mbar) in the presence of 110 ppm of the linear polyaminophosphazenium hydroxide catalyst prepared above. After a reaction time of 15 minutes, a polymer with a viscosity of approximately 166,000 cs at 25° C. was obtained with a non-volatile content of 90.6%. Residual silanol was determined to be 314.5 ppm.

Example 4

A mixture of silanol end-blocked polydimethylsiloxane and cyclodimethylsiloxane (50:50) having a viscosity of 14 mm²/s (96.2g) and a polydimethylsiloxane end-blocker with a viscosity of 5 mm²/s (3.9g) were mixed together in a reaction vessel and heated to 100° C. under reduced pressure of 200 mbar. At that temperature the linear polyaminophosphazenium hydroxide prepared above (330 ppm) was added. After 2 hours the reaction was allowed to cool and was neutralized with excess bis-(dimethylvinylsilyl) vinyl phosphonate prior to stripping for 1 hr at 145° C. The final product had viscosity 718 mm²/s, a non-volatile content of 96.0%.

III. Synthesis of 1,1,1,3,3,5,5,5-octapyrollidinium phosphazenium hydroxide

Cl₃PNPCl₂O (0.092 moles) and (Cl₃PNPCl₃)⁺(PCl₆)⁻ (0.092 moles), synthesized using known procedures were charged to a three necked flask fitted with stirrer, thermometer and condenser. To this was added 1,2,4-trichlorobenzene and the mixture was heated to 195° C. for up to 30 hours. The crude product was dissolved in tetrachloroethane and precipitated by repeat additions of carbon tetrachloride. A white crystalline product was formed, which was then washed with petroleum ether and dried under vacuum (65% yield). Conversion to the phosphazenium hydroxide was carried out by dispersing the crystalline material in distilled water and methanol (1:1) and passing it through a basic (OH⁻) anion exchange resin. The water and methanol were then removed under reduced pressure.

Example 5

Silanol end-blocked polydimethylsiloxane having a viscosity of 60 mm²/s (57.3g), octamethylcyclodisiloxane (38.8 g) and a polydimethylsiloxane end-blocker having a viscosity of 5 mm²/s (3.9 g) were mixed together in a reaction vessel. The reagents were heated up to 130° C. under vacuum and 1,1,1,3,3,5,5,5-octapyrollidium phosphazenium hydroxide (100 ppm) catalyst was added at that temperature. After 30 minutes the reaction was allowed to cool and the mixture was neutralized with excess bis-(dimethylvinylsilyl) vinyl phosphonate. The pre-stripped polymer had a non-volatile content of 87.8%. After stripping at 145° C. for 1 hour, the final product had a viscosity of 773 mm²/s and non-volatile content of 99.5%.

Example 6

Silanol end-blocked polydimethylsiloxane having a viscosity of 60 mm²/s (83.4g ), a 50/50 mixture of low silanol-end-blocked polydimethyl siloxanes having a viscosity of 14 mm²/s and cyclodimethylsiloxanes, (12.7 g) and a polydimethylsiloxane end-blocker having a viscosity of 5 mm²/s (3.9 g) were mixed together in a reaction vessel and the reaction mixture was heated to 130° C. at a reduced pressure of 400 mbar. 1,1,1,3,3,5,5,5-octapyrollidium phosphazenium hydroxide (100 ppm) catalyst was added at that temperature. After 5 minutes a sample was removed for silanol analysis (160 ppm —OH). After 1 hour a neutralization agent bis-(dimethylvinylsilyl) vinyl phosphonate, was added in excess and the mixture was stirred for 30 minutes. After stripping at 145° C. for 1 hour the final product had viscosity 420 mm²/s and a non-volatile content of 97%.

Synthesis of tetrakis(tris(dimethylamino) phosphoranilideneamino)phosphonium methoxide In a 50 ml round bottomed flask was added tetrakis(tris(dimethylamino)phosphoranilideneamino)phosphonium chloride (0.000689 moles)and dimethylsulfoxide (2 ml). To this was added sodium methoxide (0.0013 moles) and the reaction mixture heated to 50° C. and stirred for two hours. The reaction was then cooled and filtered after which the dimethylsulfoxide was removed under reduced pressure at 120° C. to yield the desired product in 98% yield.

Synthesis of tetrakis(tris(dimethylamino) phosphoranilideneamino)phosphonium trimethylsilanolate In a 50 ml round bottomed flask was added tetrakis(tris(dimethylamino)phosphoranilideneamino)phosphonium chloride (0.000675 moles) and dimethylsulfoxide (2 ml). To this was added potassium trimethylsilanolate (0.0011 moles) and the reaction mixture heated to 50° C. and stirred for two hours. The reaction was then cooled and filtered after which the dimethylsulfoxide was removed under reduced pressure at 120° C. to yield the desired product in 98% yield.

Example 7

A 74/26 mixture of silanol end-blocked polydimethylsiloxane and cyclic siloxanes (95 g) was charged to a reaction vessel together with a short chain polydimethylsiloxane (5 g) of viscosity 10 mm$^2$/s. This was heated to 135° C. under reduced pressure (600 mbar) in the presence of 180 ppm of tetrakis{tris(dimethylamino)phosphoranylidenamino}phosphonium fluoride purchased from Fluka Chemie. After approximately fifteen minutes the reaction was neutralized and stripped yielding a polymer with a viscosity of approximately 705 mm$^2$/s and a non volatile content of 99%. Residual silanol was determined to be approximately 104 ppm.

Example 8

A 74/26 mixture of silanol end-blocked polydimethylsiloxane and cyclic siloxanes (95 g) was charged to a reaction vessel together with a short chain polydimethylsiloxane (5 g) of viscosity 10 mm$^2$/s. This was heated to 135° C. under reduced pressure (600 mbar) in the presence of 100 ppm of tetrakis{tris(dimethylamino)phosphoranylidenamino}phosphonium hydroxide. After approximately fifteen minutes the reaction was neutralized and stripped yielding a polymer with a viscosity of approximately 648 mm$^2$/s and a non volatile content of 97%. Residual silanol was determined to be approximately 54 ppm.

Example 9

A 74/26 mixture of silanol end-blocked polydimethylsiloxane and cyclic siloxanes (95 g) was charged to a reaction vessel together with a short chain polydimethylsiloxane (5 g) of viscosity 10 mm$^2$/s. This was heated to 135° C. under reduced pressure (600 mbar) in the presence of 250 ppm of tetrakis{tris(dimethylamino)phosphoranylidenamino}phosphonium fluoride. After approximately five minutes the reaction was neutralized and stripped yielding a polymer with a viscosity of approximately 346 mm$^2$/s and a non volatile content of 96%. Residual silanol was determined to be approximately 123 ppm.

Example 10

A 26/74 mixture of silanol end-blocked polydimethylsiloxane and cyclic siloxanes (95 g) was charged to a reaction vessel together with a short chain polydimethylsiloxane (5 g) of viscosity 10 mm$^2$/s. This was heated to 135° C. under atmospheric pressure in the presence of 250 ppm of tetrakis{tris(dimethylamino)phosphoranylidenamino}phosphonium fluoride. After approximately fifteen minutes the reaction was neutralized and stripped yielding a polymer with a viscosity of approximately 932 mm$^2$/s and a non volatile content of 98%. Residual silanol was determined to be approximately 86 ppm.

Example 11

A 26/74 mixture of silanol end-blocked polydimethylsiloxane and cyclic siloxanes (95 g) was charged to a reaction vessel together with a short chain polydimethylsiloxane (5 g) of viscosity 10 mm$^2$/s. This was heated to 135° C. under a reduced pressure of 80ombar in the presence of 50 ppm of tetrakis{tris(dimethylamino)phosphoranylidenamino}phosphonium fluoride. After approximately five minutes the reaction was neutralized and stripped yielding a polymer with a viscosity of approximately 400 mm$^2$/s and a non volatile content of 98%. Residual silanol was determined to be approximately 140 ppm.

Example 12

A 50/50 mixture of silanol end-blocked polydimethylsiloxane and cyclic siloxanes (95 g) was charged to a reaction vessel together with a short chain polydimethylsiloxane (5 g) of viscosity 10 mm$^2$/s. This was heated to 135° C. under a reduced pressure of 600 mbar in the presence of 100 ppm of tetrakis{tris(dimethylamino)phosphoranylidenamino}phosphonium hydroxide. After approximately fifteen minutes the reaction was neutralized and stripped yielding a polymer with a viscosity of approximately 1199 mm$^2$/s and a non volatile content of 96%. Residual silanol was determined to be approximately 75 ppm.

Example 13

A silanol end-blocked polydimethylsiloxane (100 g) with a viscosity of 60 mm$^2$/s was charged to a reaction vessel and heated to 140° C. under a reduced pressure of 20 mbar in the presence of 300 ppm of tetrakis{tris(dimethylamino)phosphoranylidenamino}phosphonium methoxide. After approximately five minutes the reaction was neutralized yielding a polymer with a viscosity of approximately 985,000 mm$^2$/s and a non volatile content of 88%. Residual silanol was determined to be approximately 192 ppm.

Example 14

A silanol end-blocked polydimethylsiloxane (100 g) with a viscosity of 60 mm$^2$/s was charged to a reaction vessel and heated to 140° C. under a reduced pressure of 20 mbar in the presence of 200 ppm of tetrakis{tris(dimethylamino)phosphoranylidenamino}phosphonium trimethylsilanolate. After approximately five minutes the reaction was neutralized yielding a polymer with a viscosity of approximately 950,000 mm$^2$/s and a non volatile content of 88 W. Residual silanol was determined to be approximately 168 ppm.

Example 15

A 74/26 mixture of silanol end-blocked polydimethylsiloxane (95 g) with a viscosity of 60 mm$^2$/s was charged to a reaction vessel together with a short chain polydimethylsiloxane (5 g) of viscosity 10 mm$^2$/s. This was heated to 135° C. under a reduced pressure of 600 mbar in the presence of 200 ppm of tetrakis{tris(dimethylamino)phosphoranylidenamino}phosphonium trimethylsilanolate. After approximately twenty minutes the reaction was neutralized yielding a polymer with a viscosity of approximately 1,081 mm$^2$/s and a non volatile content of >96%. Residual silanol was determined to be approximately 127 ppm.

Example 16

A 74/26 mixture of silanol end-blocked polydimethylsiloxane (95 g) with a viscosity of 60 mm$^2$/s was charged to a reaction vessel together with a short chain polydimethylsiloxane (5 g) of viscosity 10 mm$^2$/s. This was heated to 135° C. under a reduced pressure of 600 mbar in the presence of 150 ppm of tetrakis{tris(dimethylamino) phosphoranylidenamino}phosphonium methoxide. After approximately twenty minutes the reaction was neutralized yielding a polymer with a viscosity of approximately 1,084 mm$^2$/s and a non volatile content of >96%. Residual silanol was determined to be approximately 111 ppm.

That which is claimed is:

1. A process for polymerizing a siloxane having silicon-bonded groups R', wherein R' denotes a hydroxyl group or a hydrocarbonoxy group having up to 8 carbon atoms, comprising mixing the siloxane with an ionic phosphazene base catalyst and allowing the siloxane to polymerize by condensation via reaction of Si—R' groups with the formation of a Si—O—Si linkage.

2. A process according to claim 1, wherein the ionic phosphazene base catalyst has the general formula

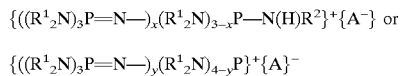

wherein each R$^1$ is selected from the group consisting of hydrogen, hydrocarbon groups and substituted hydrocarbon group or in which two R$^1$ groups bonded to the same N atom may be linked to complete a heterocyclic ring, R$^2$ is selected from the group consisting of hydrogen, hydrocarbon groups and substituted hydrocarbon groups, x is 1 to 3, y is 1 to 4 and A is an anion.

3. A process according to claim 2, wherein A denotes fluoride, hydroxide, silanolate, alkoxide, or bicarbonate.

4. A process according to claim 3, wherein R$^1$ denotes methyl, R$^2$ is selected from the group consisting of tertiary butyl and tertiary octyl, x is 3, y is 4 and A is selected from fluoride and hydroxide.

5. A process according to claim 1, wherein polymerization is carried out in the presence of a solvent selected from the group consisting of liquid hydrocarbons and silicone fluids.

6. A process according to claim 1, wherein the siloxane having silicon-bonded groups R' is an organosiloxane having the general formula

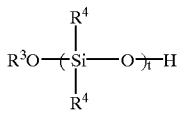

wherein R$^3$ is selected from the group consisting of hydrogen, alkyl groups having 1 to 8 carbon atoms and aryl groups having 6 to 8 carbon atoms, each R$^4$ is selected from monovalent hydrocarbon groups having 1 to 18 carbon atoms and halogenated hydrocarbon groups having 1 to 18 carbon atoms and t has a value of at least 2.

7. A process according to claim 1, wherein the siloxane having silicon-bonded groups R' and a cyclic or linear siloxane having no silicon-bonded groups R' are mixed with an ionic phosphazene base catalyst and the siloxane having silicon-bonded groups R' is allowed to polymerize by condensation while the siloxane having no silicon-bonded R' groups is allowed to polymerize by equilibration.

8. A process according to claim 1, characterized in that an end-blocker, selected from the group consisting of organosiloxanes of the general formula MD$_x$M where M is (CH$_3$)$_3$SiO$_{1/2}$, D is (CH$_3$)$_2$SiO$_{2/2}$ and x has a value of 0 to 20, siloxane polymers having up to 25 silicon atoms and having only one silicon-bonded R' group and silanes containing only one silicon-bonded R' group, is present during polymerization.

9. A process according to claim 1 further comprising neutralizing the catalyst by adding an acid, selected from the group consisting of acetic acid, silyl phosphate, polyacrylic acid, chlorine substituted silanes, silyl phosphonate and carbon dioxide, when the desired polymer has been made.

* * * * *